US010028872B1

(12) United States Patent
Chen

(10) Patent No.: US 10,028,872 B1
(45) Date of Patent: Jul. 24, 2018

(54) FOOTPLATE STRUCTURE OF WHEELCHAIR

(71) Applicant: KWANG YANG MOTOR CO., LTD., Kaohsiung (TW)

(72) Inventor: Yi-Tso Chen, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 15/397,750

(22) Filed: Jan. 4, 2017

(51) Int. Cl.
*B62M 1/14* (2006.01)
*A61G 5/12* (2006.01)

(52) U.S. Cl.
CPC .......... *A61G 5/128* (2016.11); *A61G 2200/34* (2013.01); *A61G 2203/00* (2013.01)

(58) Field of Classification Search
CPC ............................ A61G 5/128; A61G 2200/34
USPC ............................................... 280/291, 304.1
See application file for complete search history.

(56) References Cited

U.S. PATENT DOCUMENTS

| | | | | | |
|---|---|---|---|---|---|
| 6,880,845 | B1 * | 4/2005 | Broyles | A61G 5/12 280/250.1 |
| 9,474,666 | B1 * | 10/2016 | Smith | A61G 5/10 |
| 2008/0001461 | A1 * | 1/2008 | Fujihara | A61G 5/12 297/423.35 |
| 2013/0292988 | A1 * | 11/2013 | Jeyasurya | A61G 5/14 297/423.26 |

* cited by examiner

*Primary Examiner* — Tony H Winner
(74) *Attorney, Agent, or Firm* — Leong C. Lei

(57) ABSTRACT

A footplate structure of a wheelchair is provided. The wheelchair includes a support frame unit, a rear wheel assembly mounted on the support frame unit, a front wheel assembly mounted to the support frame unit, a seat unit arranged at a central portion of the support frame unit, a footplate unit arranged at a front end of the support frame unit, and a footplate control unit operable to control the footplate unit. With the footplate control unit set beside the footplate unit, the footplate control unit may control a footplate of the footplate unit to be in an upright position or a horizontal position so as to improve operation performance of the wheelchair.

7 Claims, 8 Drawing Sheets

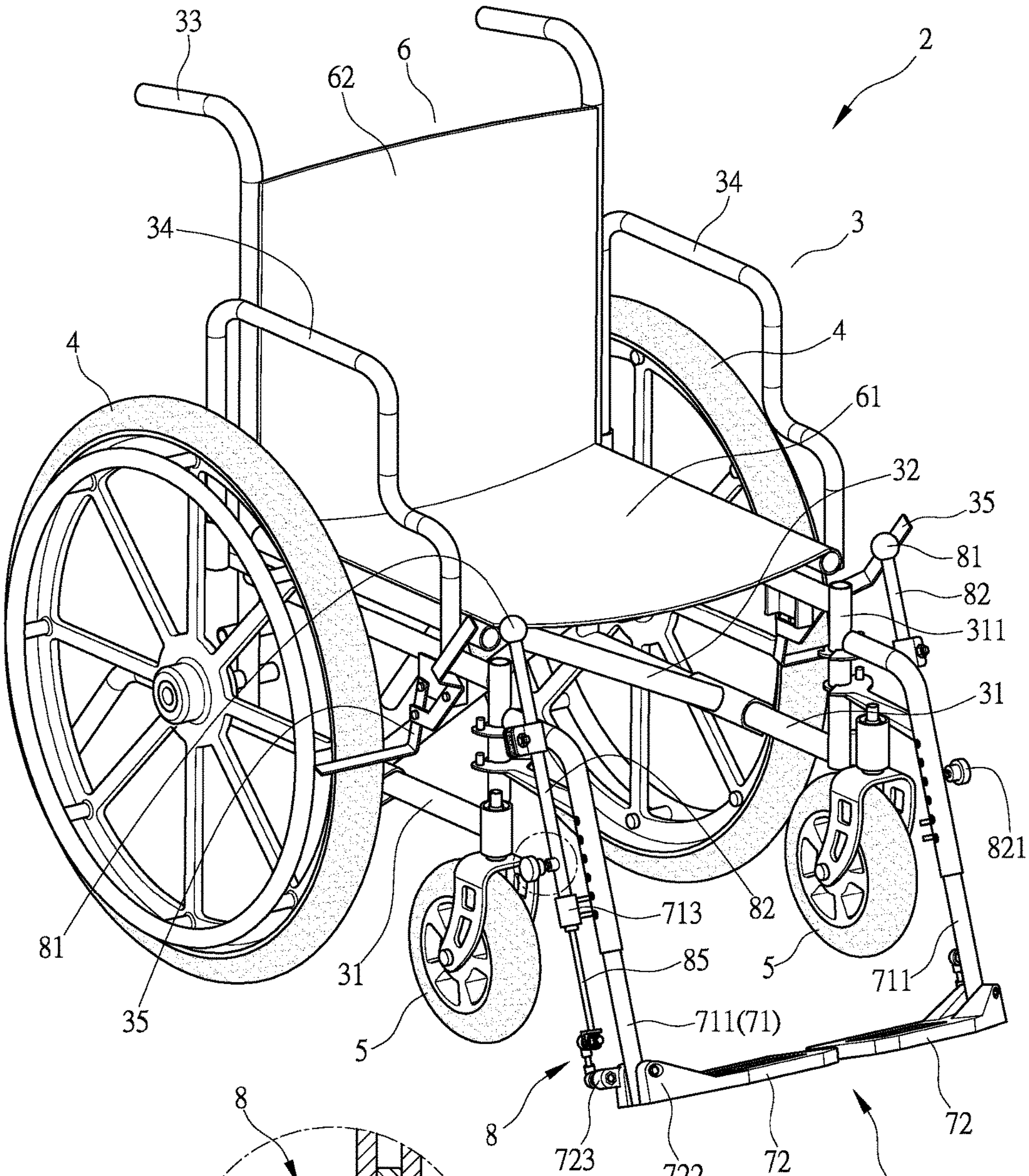
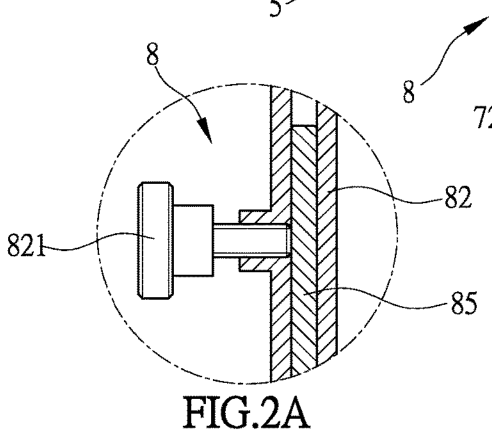
FIG.2A
FIG.2

FOOTPLATE STRUCTURE OF WHEELCHAIR

TECHNICAL FIELD OF THE INVENTION

The present invention relates to a footplate structure of a wheelchair, and more particularly to a footplate structure of the wheelchair that facilitates controllability of a footplate unit of the wheelchair.

DESCRIPTION OF THE PRIOR ART

As shown in FIG. 1, to facilitate outdoor activity or transportation of a limb disabled person, a wheelchair 1 is often used to provide assistance. The wheelchair 1 is provided, a pair of left and right rear wheels 12 and a pair of left and right front wheels 13 respectively set at two sides of a support frame unit 11. The support frame unit 11 is provided, at a central portion thereof, with a seat unit 14. The support frame unit 11 is provided, on a front end 11*a* thereof, with a pair of left and right footplate support racks 15. The footplate support racks 15 are each provided with a pivot pin 151, and the pivot pin 151 rotatably supports a footplate 16, so that the footplate 16 is allowed to freely rotate about a rotation center defined by the pivot pin 151.

As shown in FIG. 1, to use the wheelchair 1, the footplates 16 must be first pulled upright, meaning rotating the footplates 16 in a direction toward a top side of the wheelchair 1, so as to have the footplates 16 set in an upright condition in a vertical direction of the wheelchair 1 to make the front side of the wheelchair 1 an open space that allows for easy sitting of the disabled person on the seat unit 14. After the user has sit on the seat unit 14, the footplates 16 are then rotated back to a horizontal position with respect to the wheelchair 1 so that the footplates 16 may receive the feet of the user to be positioned thereon.

Since the wheelchair 1 is often used in medical facility, contamination commonly occurs on the footplates 16. The user or an attendant, when attempting to use a hand to pull and rotate the footplates 16, is subject to potential risk of contamination. Further, if no attendant is present to assist the user to pull and rotate the footplates 16, the user, who is a disabled person, may be hard to rotate the footplates 16.

Thus, it is a challenge of the manufacturers of wheelchair to provide a footplate structure of a wheelchair, which makes rotation of footplates easy.

SUMMARY OF THE INVENTION

The primary objective of the present invention is to provide a footplate structure of a wheelchair, which overcomes the drawbacks of poor controllability of a footplate of a prior art wheelchair.

Thus, a primary technical solution of the present invention presented in claim 1 is to provide a footplate structure of a wheelchair, wherein the wheelchair comprises a support frame unit, a rear wheel assembly mounted to the support frame unit, a front wheel assembly mounted to the support frame unit, a seat unit arranged at a central portion of the support frame unit, a footplate unit mounted to a front end of the support frame unit, and a footplate control unit that is operable to control the footplate unit.

The efficacy that the present invention may achieved with the technical solution presented in claim 1 is that with a footplate control unit set beside a footplate unit, a footplate control unit is operable to control a footplate of the footplate unit to be set at an upright position or a horizontal position so as to improve the operation performance of the wheelchair.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2 is a perspective view showing a wheelchair according to the present invention.

FIG. 2A is an enlarged view of a circled portion of FIG. 2.

DETAILED DESCRIPTION OF THE PREFERRED EMBODIMENTS

Figure 1:
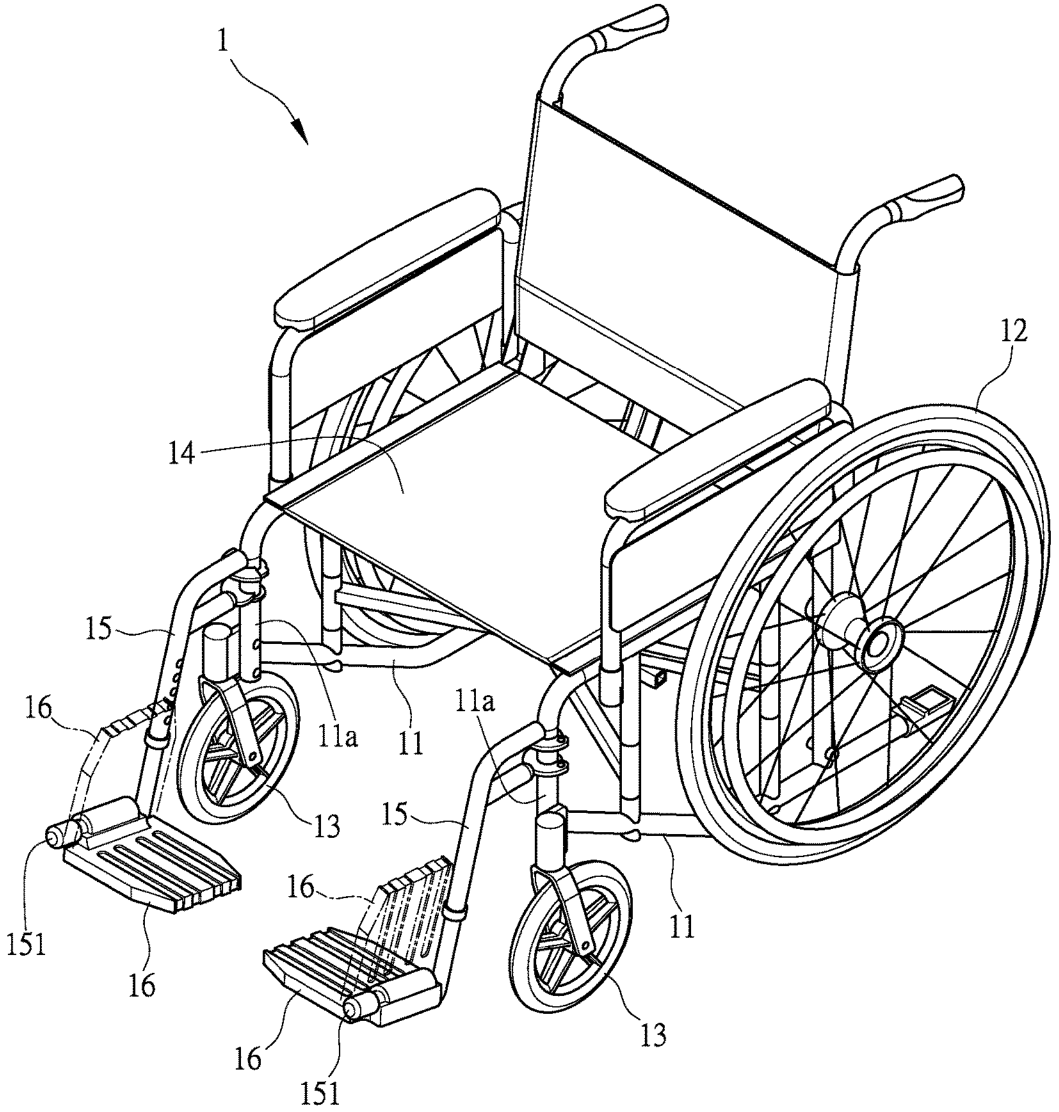
PRIOR ART FIG.1
FIG. 1 is a schematic view illustrating a conventional wheelchair.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Firstly, referring to FIG. 2, the present invention provides a footplate structure of a wheelchair. The wheelchair 2 comprises a support frame unit 3, rear wheel assemblies 4 arranged at a rear side of the support frame unit 3, front wheel assemblies 5 arranged at a front side of the support frame unit 3, a seat unit 6 arranged at a center of the support frame unit 3, a footplate unit 7 arranged at a front end of the support frame unit 3, and a footplate control unit 8 that controls the footplate unit 7.

As shown in FIG. 2, the support frame unit 3 comprises a pair of side frame sections 31 respectively arranged at left side and right side. A cross connection frame section 32 is arranged between the pair of side frame sections 31. The side frame sections 31 each comprise a push frame section 33 projecting from a rear side thereof toward a top of the wheelchair 2. The side frame sections 31 each comprise an armrest frame section 34 projecting upward from a top of one side thereof, namely on a lateral side of the wheelchair 2. The side frame sections 31 receive, respectively, the rear wheel assemblies 4 to be rotatably supported on the rear sides thereof. The side frame sections 31 each comprise a brake assembly 35 mounted thereto at a location adjacent to and in front of each of the rear wheel assemblies 4 such that the brake assemblies 35 may provide an effect of braking to the rear wheel assemblies 4, respectively, so as to prevent the wheelchair 2 from movement. The side frame sections 31 each comprise, on a front end thereof, a front vertical tube 311, and the front vertical tubes 311 rotatably support the front wheel assemblies 5, respectively. The rear wheel assemblies 4 have a wheel diameter that is greater than that of the front wheel assemblies 5.

As shown in FIGS. 2 and 2A, the rear wheel assemblies 4 are arranged, in pair with one being on left side and the other being on right side, to be rotatably supported on the rear side of the support frame unit 3.

As shown in FIGS. 2 and 2A, the front wheel assemblies 5 are arranged, in pair with one being on left side and the other being on right side, to be rotatably supported on the front side of the support frame unit 3.

As shown in FIG. 2, the seat unit 6 is arranged a central portion of the support frame unit 3. The seat unit 6 comprises a seat section 61 and a back support section 62. The seat section 61 is mounted on the pair of side frame sections 31 of the support frame unit 3. The back support section 62 is mounted to the push frame sections 33 of the support frame unit 3.

Figure 3:
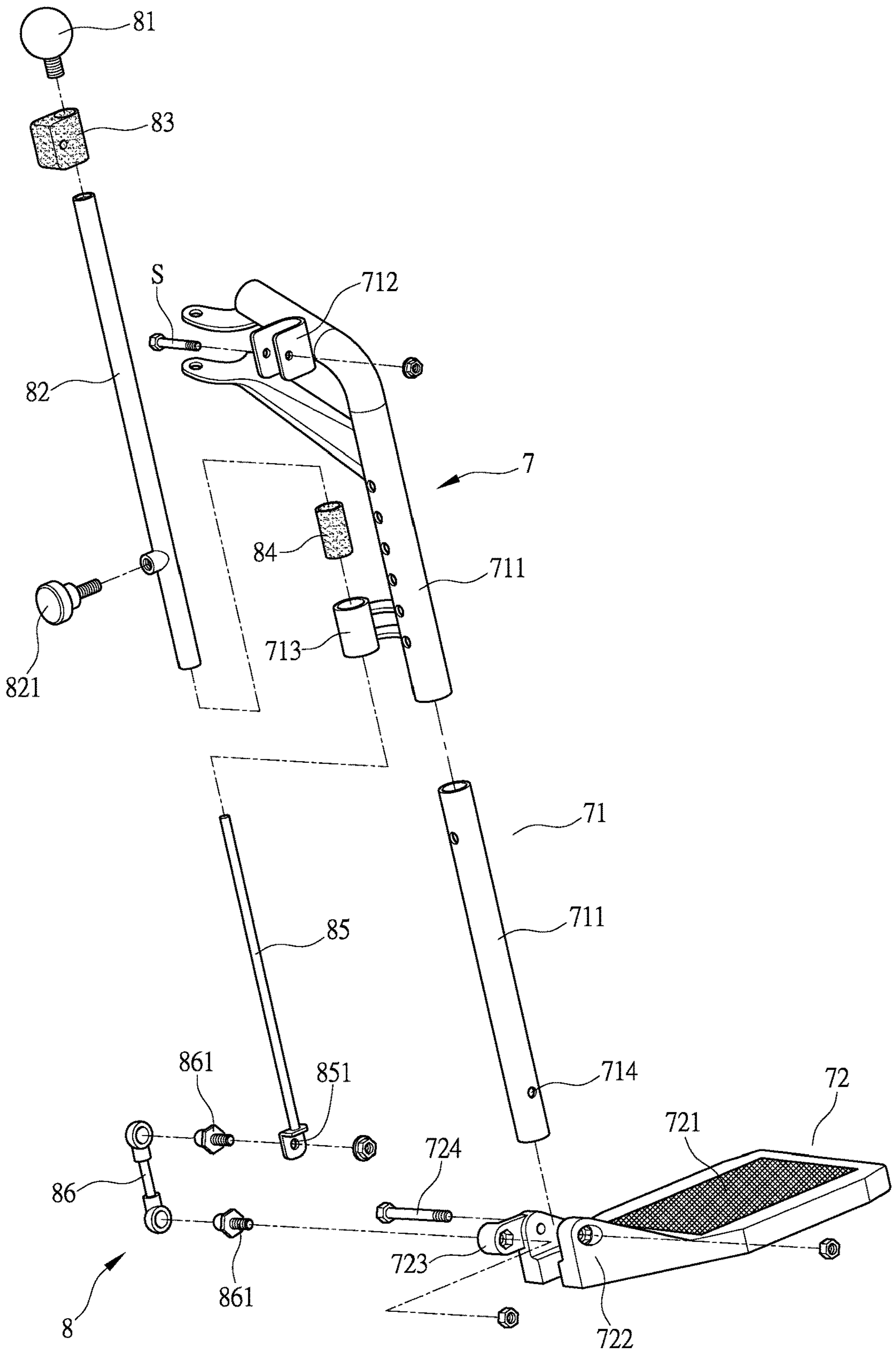
FIG. 3 is an exploded view showing a footplate unit and a footplate control unit according to the present invention.

As shown in FIGS. 2 and 3, the footplate unit 7 is arranged at front ends of the side frame sections 31 of the support frame unit 3. More specifically, the footplate unit 7 is mounted to the front vertical tubes 311 of the side frame sections 31. The footplate unit 7 comprises a connection frame section 71 and footplates 72 rotatably mounted to the connection frame section 71. The connection frame section 71 comprises a pair of connection tubes 711, respectively at left side and right side, and the connection frame section 71 is mounted to the front vertical tubes 311 of the side frame sections 31 of the support frame unit 3. The connection frame section 71 is a frame that allows for selective extension and retraction for adjustment of a length thereof. The footplates 72 are arranged in pair, with one being at left side and the other being at the right side, and rotatably mounted to a lower end of the connection frame section 71. The footplate 72 each comprise a foot support section 721, a pivot joint section 722 arranged at one side of the foot support section 721, and a rotatable coupling section 723 arranged at one end of the footplate 72. The footplate 72 is rotatably supported by a pivot pin 724 on a pivot hole 714 formed in the lower end of the connection frame section 71. The connection frame section 71 comprises a first coupling section 712 and a second coupling section 713 projecting therefrom toward outside of the wheelchair 2. The first coupling section 712 and the second coupling section 713 are provided for coupling with the footplate control unit 8. The first coupling section 712 is in the form of a U-shaped coupling seat, while the second coupling section 713 is in the form of a cylindrical coupling seat.

As shown in FIGS. 2 and 3, the footplate control unit 8 comprises a control handle 81, a first bar 82 that is in a tubular form and receives the control handle 81 to extend therethrough, a first resisting member 83 that receives the first bar 82 to extend therethrough, a second resisting member 84 that receives the first bar 82 to extend therethrough, a second bar 85 that is received through and coupled in the first bar 82, a rotatable coupling member 86 that is connected to an end of the second bar 85. A lower end of the control handle 81 penetrates into the first bar 82 and is coupled to the first bar 82. The first resisting member 83 is arranged in the first coupling section 712 of the connection frame section 71 and a fastener element S is applied to fix the first resisting member 83 in the first coupling section 712 of the connection frame section 71. The first resisting member 83 is made of a rubber material or a plastic material so that inside and outside surfaces of the first resisting member 83 both exhibit high frictional resistance, whereby when the first bar 82 is received through the first resisting member 83, an effect of fixing and positioning is achieved for an upper end of the first bar 82. The first bar 82 is provided, on a side surface thereof, with a tension regulation screw 821. The first bar 82 is a hollow tubular bar and thus, the first bar 82 may receive the second bar 85 to extend therethrough so that the arrangement of the tension regulation screw 821 may selectively fix the second bar 85 at a position of being located inside the first bar 82. A lower end of the first bar 82 is received in the second resisting member 84. The second resisting member 84 is a hollow cylinder made of a rubber material or a plastic material so that inside and outside surfaces of the second resisting member 84 both exhibit high frictional resistance. The second resisting member 84 is received in the second coupling section 713 of the connection frame section 71 and the second resisting member 84 can be securely retained and fixed in the second coupling section 713 of the connection frame section 71 by means of the high frictional resistance of the outside surface thereof. An upper end of the second bar 85 is received in the first bar 82 and a lower end of the second bar 85 is provided with a rotatable coupling hole 851. An upper end of the rotatable coupling member 86 is rotatably coupled to the rotatable coupling hole 851 of the second bar 85 by means of a rotatable coupling bolt 861. A lower end of the rotatable coupling member 86 is also rotatably coupled, by another rotatable coupling bolt 861, to the rotatable coupling section 723 of the footplate 72.

Figure 4:
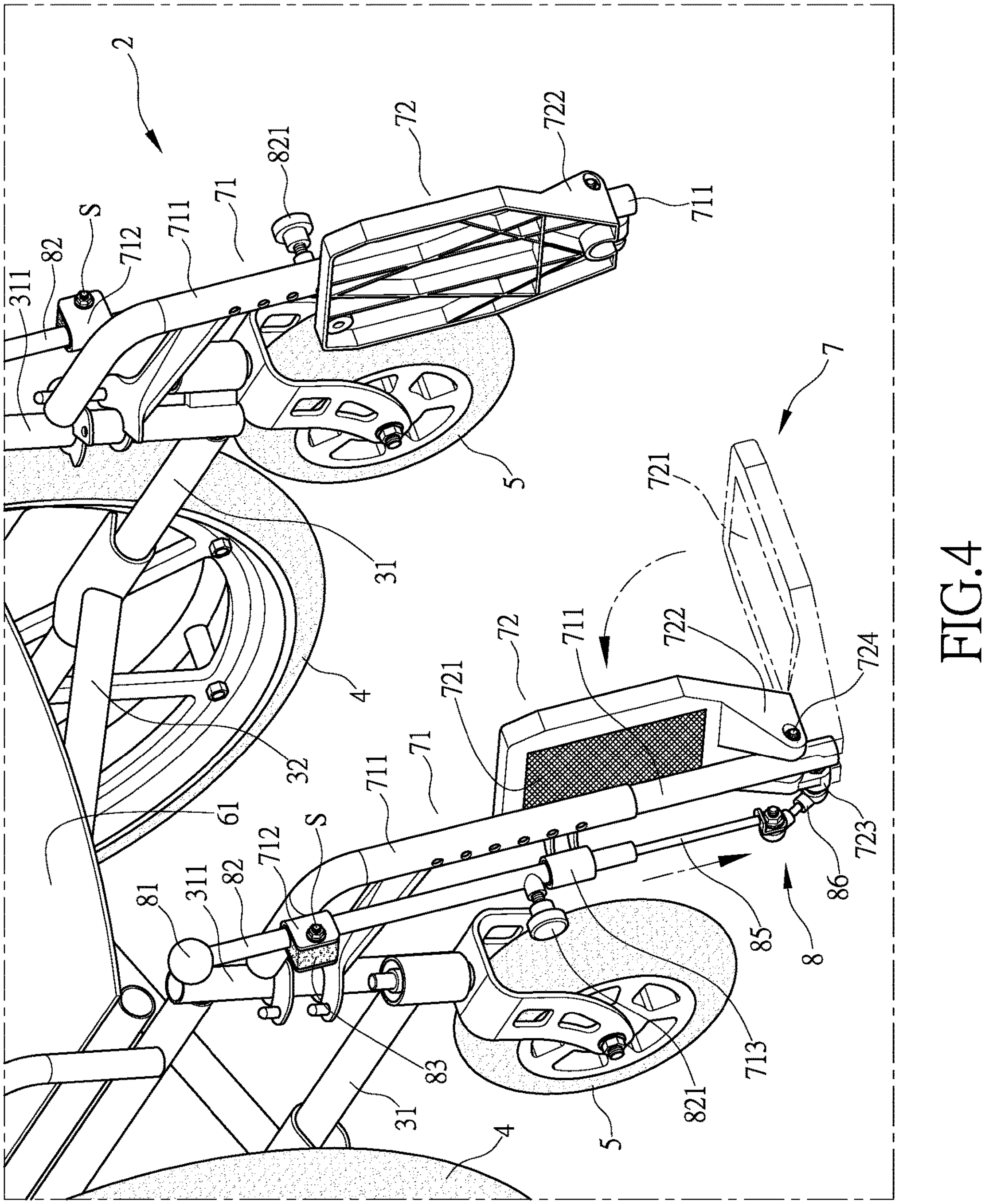
FIGS. 4 and 5 are schematic view illustrating an operation of the footplate unit and the footplate control unit according to the present invention.

As shown in FIG. 4, to use the present invention, when a user attempts to sit on the wheelchair 2, to allow the user to easily sit down, the user or an attendant may press down the control handle 81 of the footplate control unit 8, wherein a pressing force that presses down the control handle 81 is transmitted through the first bar 82 to the second bar 85 so that the second bar 85 may apply a downward pushing force through the rotatable coupling member 86 to the rotatable coupling section 723 of the footplate 72 of the footplate unit 7, whereby the footplate 72 is rotated, with the pivot pin 724 as a rotation center, to have the foot support section 721 rotated and lifted upward and thus the footplate 72 is caused to erected upward in a vertical direction of the wheelchair 2 thereby making the front side of the wheelchair 2 an open space, allowing the user to easily sit on the wheelchair 2.

Figure 5:
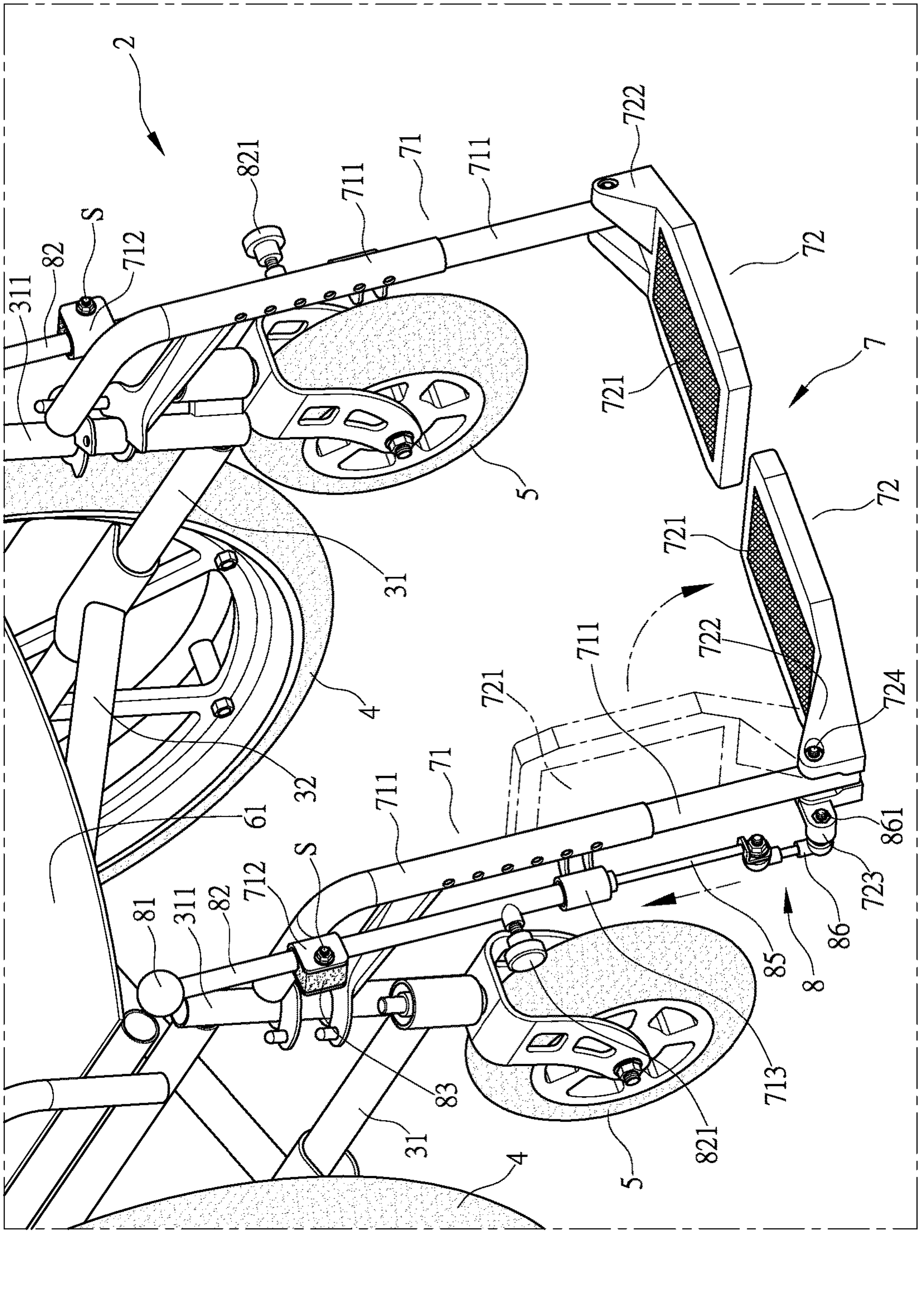

As shown in FIG. 5, when the user has sit on the seat section 61 of the seat unit 6 of the wheelchair 2, the user or the attendant may pull up the control handle 81 of the footplate control unit 8 so that when the control handle 81 has been pulled up, the first bar 82 and the second bar 85 are pulled up at the same time and the second bar 85 may simultaneously cause the rotatable coupling member 86 to pull up the rotatable coupling section 723 of the footplate 72 of the footplate unit 7, whereby the footplate 72 is rotated, with the pivot pin 724 as a rotation center, to have the foot support section 721 rotated downward and the footplate 72 is set horizontally in a lateral direction of the wheelchair 2 so as to allow a foot of the user be positioned on and supported by the footplate 72 of the footplate unit 7. In this way, the efficacy of utilization of the wheelchair 2 can be improved.

Figure 6:
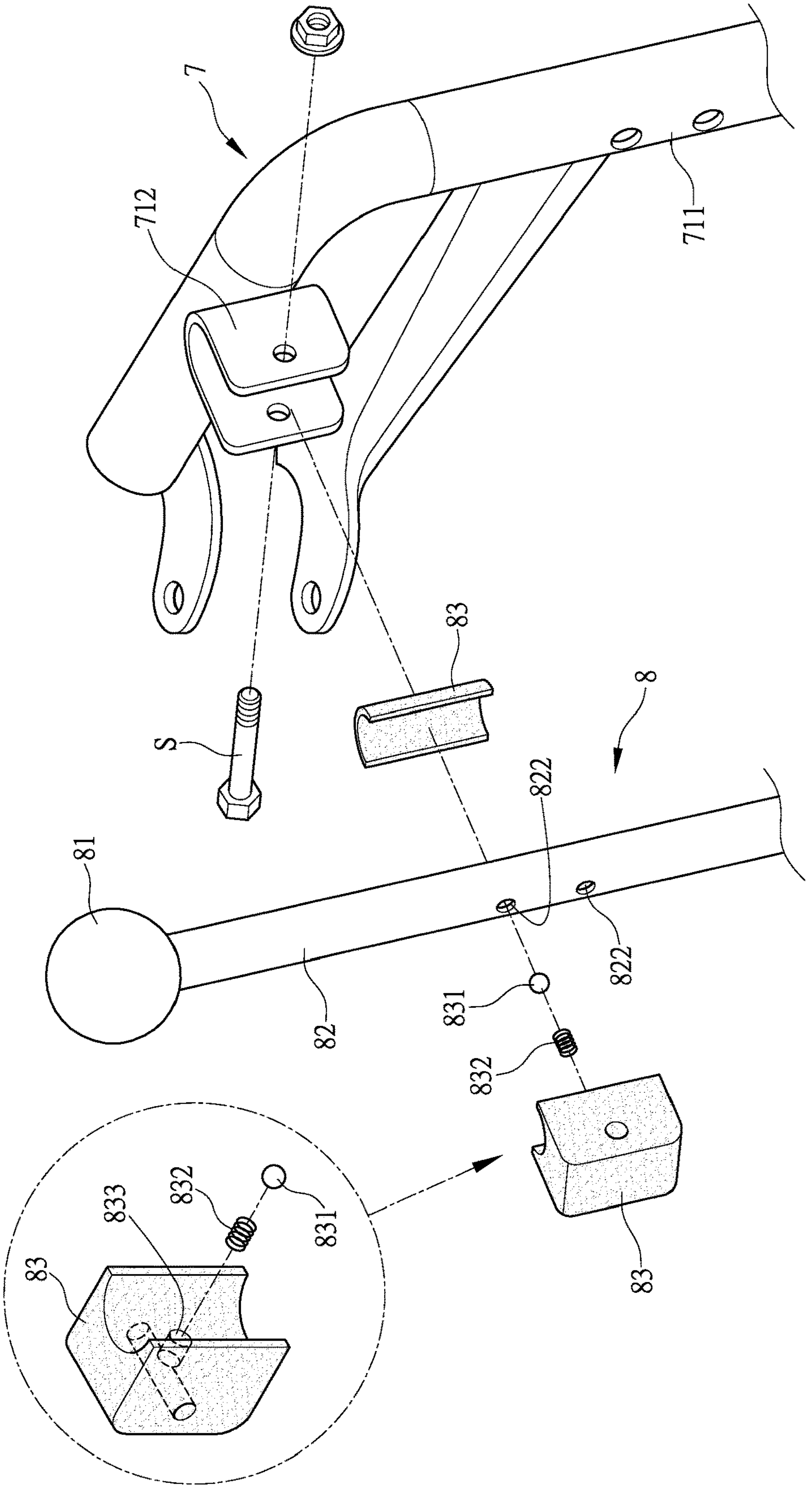
FIG. 6 illustrates a first bar and a first resisting member according to another embodiment of the present invention.
Figure 7:
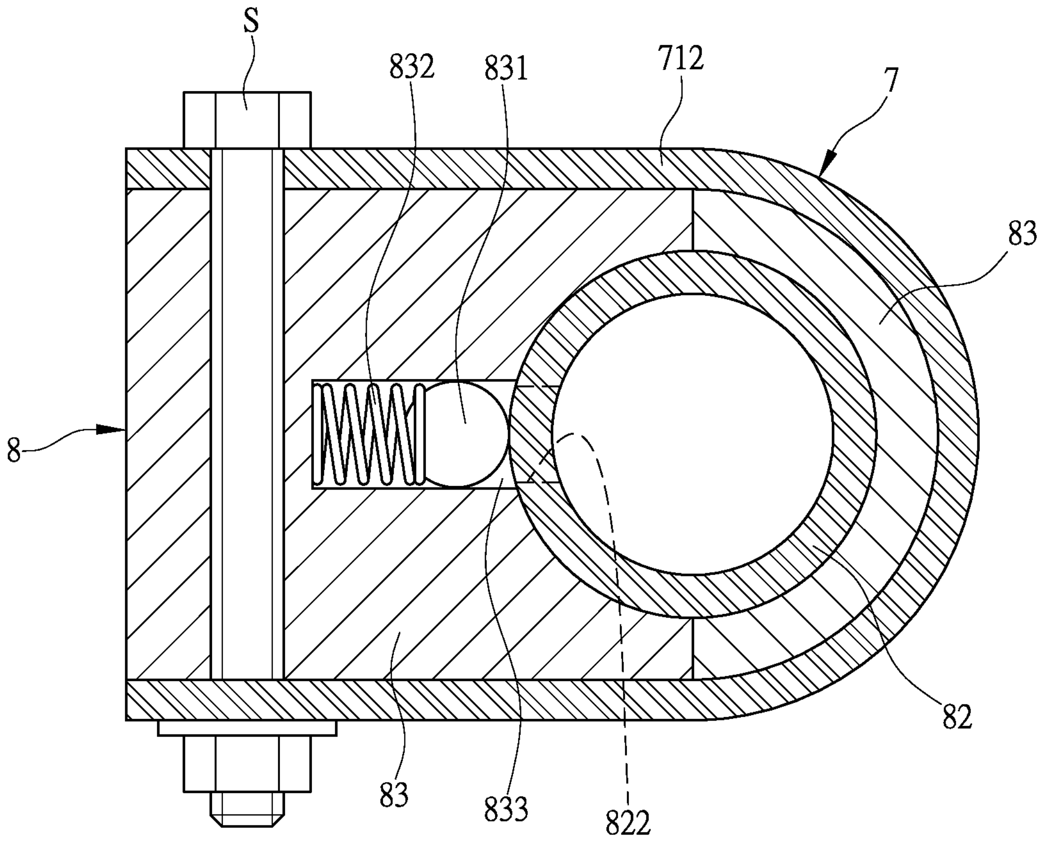
FIGS. 7 and 8 are schematic views illustrating a positioning operation of the first bar and the first resisting member according to the present invention.
Figure 8:
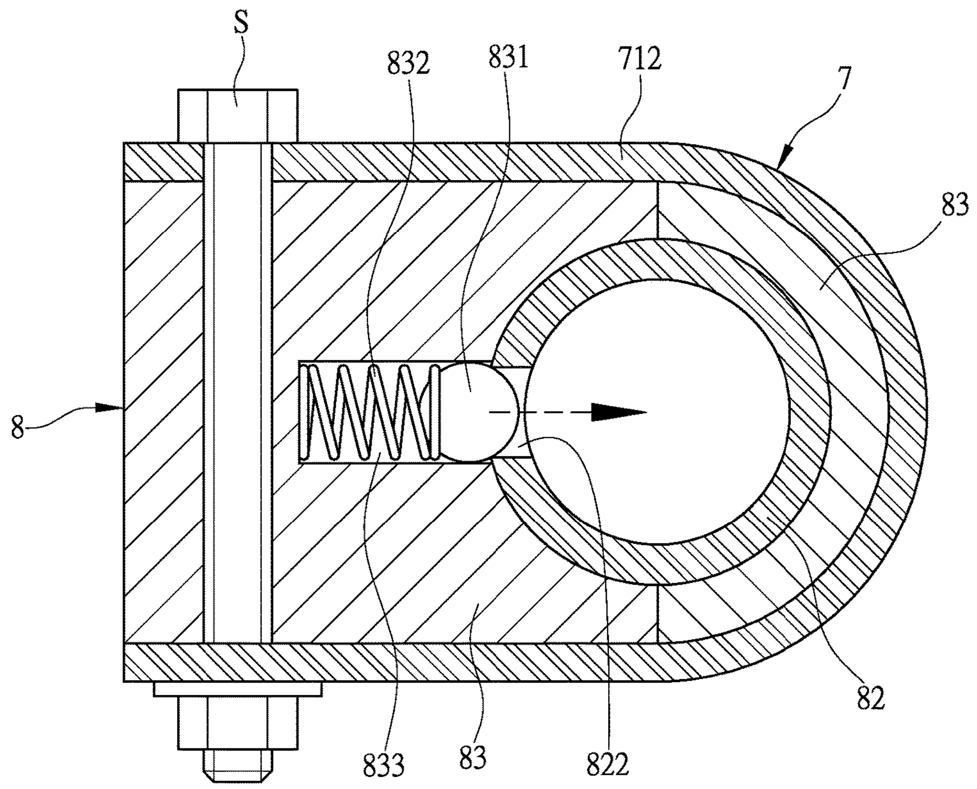

As shown in FIGS. 6, 7, and 8, in an embodiment of the present invention, the first bar 82 is further provided, in a side thereof, with a plurality of positioning holes 822. The first resisting member 83 is provided with a mounting hole 833, and the mounting hole 833 receives a positioning bead 831 and a spring 832 mounted therein. The spring 832 biases the positioning bead 831 to have the positioning bead 831 selectively fit into the positioning holes 822 of the first bar 82 so as to achieve an effect of positioning and fixing the first bar 82 in the first resisting member 83. The footplate control unit 8 may thus be positioned and fixed by means of the first bar 82 being set in the first resisting member 83 so as to provide an effect of positioning the footplate 72 of the footplate unit 7.

The primary efficacy of the present invention is that a footplate control unit 8 is provided beside the footplate unit 7 so that the footplate control unit 8 may control the footplate 72 of the footplate unit 7 to be set at an upright position or a horizontal position thereby improving operation performance of the wheelchair 2.

The second efficacy of the present invention is that the support frame unit 3 comprises side frame sections 31 that are arranged to be one at the left side, while the other at the right side, wherein the side frame sections 31 each comprise a front vertical tube 311 mounted to a front end thereof; the side frame sections 31 each support a rear wheel assembly 4 in a rotatable manner at a rear side thereof; the front vertical tube 311 supports, in a rotatable manner, the front wheel assembly 5 thereon; and the footplate unit 7 is coupled to the front vertical tubes 311, whereby assembly of the footplate unit 7 is made easy.

The third efficacy of the present invention is that the footplate unit 7 comprises connection frame sections 71 and a footplate 72 rotatably mounted to each of the connection frame sections 71. The footplates 72 are arranged in pair, with one being at the left side and the other at the right side, and rotatably mounted to a lower end of the connection frame section 71. The footplates 72 each comprise a foot support section 721, a pivot joint section 722 arranged at one side of the foot support section 721, and a rotatable coupling section 723 arranged at one end of the footplate 72. The footplate 72 is rotatably supported by a pivot pin 724 on a pivot hole 714 formed in a lower end of the connection frame section 71. The connection frame section 71 comprises, projecting toward outer side of the wheelchair 2, a first coupling section 712 and a second coupling section 713 formed thereon, wherein the first coupling section 712 and the second coupling section 713 are provided for securely mounting the footplate control unit 8 so as to facilitate the assembly of the footplate control unit 8.

The fourth efficacy of the present invention is that the first coupling section 712 is a U-shaped coupling seat and the second coupling section 713 is a cylindrical coupling seat for facilitating the assembly of the footplate control unit 8.

The fifth efficacy of the present invention is that the footplate control unit 8 comprises a control handle 81, a first bar 82 that receives the control handle 81 to extend therein, a first resisting member 83 that receives the first bar 82 to extend therethrough, a second resisting member 84 that receives the first bar 82 to extend therein, a second bar 85 that is received and coupled in the first bar 82, and a rotatable coupling member 86 mounted to an end of the second bar 85, and as such, the assembly and controllability of the footplate control unit 8 are enhanced.

The sixth efficacy of the present invention is that the first resisting member 83 is made of a rubber material or a plastic material and the first resisting member 83 possesses high frictional resistance; and the second resisting member 84 is a hollow cylindrical member made of a rubber material or a plastic material and the second resisting member 84 possesses high frictional resistance, so as to enhance the assembly and controllability of the footplate control unit 8.

The seventh efficacy of the present invention is that the first bar 82 is a hollow tubular bar so that the first bar 82 may receive the second bar 85 to extend therein and the first bar 82 is provided, on a side thereof, with a tension regulation screw 821, so that the tension regulation screw 821 may selectively fix the second bar 85 at a position inside the first bar 82 to thereby improve the controllability of the footplate control unit 8.

The eighth efficacy of the present invention is that the first bar 82 is provided, in a side thereof, with a plurality of positioning holes 822, and the first resisting member 83 is provided with a mounting hole 833, wherein the mounting hole 833 receives a positioning bead 831 and a spring 832 mounted therein such that the spring 832 biases the positioning bead 831 to have the positioning bead 831 selectively fit into the positioning holes 822 of the first bar 82, whereby an effect of positioning and fixing the first bar 82 in the first resisting member 83 may be achieved, while an effect of positioning and fixing of the footplate control unit 8 may be achieved with the first bar 82 set in the first resisting member 83 so as to provide an effect of positioning the footplate 72 of the footplate unit 7.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A footplate structure of a wheelchair, wherein the wheelchair comprises a support frame unit, rear wheel assemblies mounted to the support frame unit, front wheel assemblies mounted to the support frame unit, a seat unit mounted at a central portion of the support frame unit, a footplate unit arranged at a front end of the support frame unit, and a footplate control unit operable to control the footplate unit;

wherein the footplate control unit comprises a control handle, a first bar that receive the control handle to extend therein and couple thereto, a first resisting member that receives the first bar to extend therethrough, a second resisting member that receives the first bar to extend therein, a second bar that is received and coupled in the first bar, and a rotatable coupling member mounted to an end of the second bar.

2. The footplate structure of the wheelchair according to claim 1, wherein the support frame unit comprises a pair of side frame sections respectively arranged at a left side and a right side, the side frame sections each having a front end that comprises a front vertical tube mounted thereto, the side frame sections having rear sides to which the rear wheel assemblies are respectively and rotatably mounted, the front vertical tubes respectively receiving the front wheel assemblies to be rotatably mounted thereto, the footplate unit being coupled to the front vertical tubes.

3. The footplate structure of the wheelchair according to claim 1, wherein the footplate unit comprises a connection frame section and footplates rotatably mounted to the connection frame section, the footplates being arranged in pair, with one at a left side and the other at a right side of the wheelchair, and rotatably mounted to a lower end of the connection frame section, the footplates each comprising a foot support section, a pivot joint section arranged at one side of the foot support section, and a rotatable coupling section arranged at one end of the footplate, the footplate being rotatably supported by a pivot pin on a pivot hole formed in a lower end of the connection frame section, the connection frame section comprising a first coupling section and a second coupling section mounted thereto and projecting therefrom toward an outer side of the wheelchair, the first coupling section and the second coupling section being provided for securely mounting the footplate control unit.

4. The footplate structure of the wheelchair according to claim 3, wherein the first coupling section comprises a U-shaped coupling seat and the second coupling section comprises a cylindrical coupling seat.

5. The footplate structure of the wheelchair according to claim 1, wherein the first resisting member is formed of a rubber material or a plastic material and the first resisting member comprises exhibits high frictional resistance; and the second resisting member comprises a hollow cylinder made of a rubber material or a plastic material and the second resisting member comprises exhibits high frictional resistance.

6. The footplate structure of the wheelchair according to claim 1, wherein the first bar comprises a hollow tubular bar and the first bar receives the second bar to extend therein and the first bar is provided, on a side thereof, with a tension regulation screw, so that the tension regulation screw selectively fixes the second bar at a position inside the first bar.

7. The footplate structure of the wheelchair according to claim 1, wherein the first bar comprises a plurality of positioning holes formed in a side thereof and the first resisting member comprises a mounting hole formed therein, wherein the mounting hole receives a positioning bead and a spring mounted therein such that the spring biases the positioning bead to have the positioning bead selectively fit into the positioning holes of the first bar.

* * * * *